US 9,581,254 B2

(12) United States Patent
Isono

(10) Patent No.: US 9,581,254 B2
(45) Date of Patent: Feb. 28, 2017

(54) PRESSURE REGULATOR AND HYDRAULIC BRAKE SYSTEM FOR VEHICLE EQUIPPED WITH THE SAME

(71) Applicant: TOYOTA JIDOSHA KABUSHIKI KAISHA, Toyota-shi, Aichi-ken (JP)

(72) Inventor: Hiroshi Isono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 14/811,247

(22) Filed: Jul. 28, 2015

(65) Prior Publication Data

US 2016/0053900 A1  Feb. 25, 2016

(30) Foreign Application Priority Data

Aug. 21, 2014 (JP) ................. 2014-168246
Aug. 21, 2014 (JP) ................. 2014-168249
Oct. 8, 2014 (JP) ................. 2014-206991

(51) Int. Cl.
*B60T 8/32* (2006.01)
*F16K 11/07* (2006.01)
(Continued)

(52) U.S. Cl.
CPC ............. *F16K 11/07* (2013.01); *B60T 7/042* (2013.01); *B60T 13/146* (2013.01);
(Continued)

(58) Field of Classification Search
CPC .......... B60T 7/04; B60T 7/042; B60T 8/4072; B60T 8/4077; B60T 13/14; B60T 13/68;
(Continued)

(56) References Cited

U.S. PATENT DOCUMENTS 4,995,677 A    2/1991  Matsuda et al.
5,171,073 A *  12/1992  Matsuda ................. B60T 8/341
                                                   303/115.4
(Continued)

FOREIGN PATENT DOCUMENTS

JP    2013-227016 A    11/2013
WO   2012/133456 A1   10/2012
WO   2013/125715 A1    8/2013

OTHER PUBLICATIONS

U.S. Appl. No. 14/810,839 issued on Jul. 28, 2015 for Isono.
(Continued)

*Primary Examiner* — Christopher Schwartz
(74) *Attorney, Agent, or Firm* — Oliff PLC

(57) ABSTRACT

A pressure regulator configured to regulate a working fluid by a pilot pressure, including: a spool valve mechanism having a spool; a biasing mechanism having a pilot-pressure chamber and a pilot piston, the biasing mechanism being configured to bias the spool toward the other end of the pressure regulator in its axial direction by a pressure of the working fluid in the pilot-pressure chamber; a counter biasing mechanism having a regulated-pressure chamber and a counter biasing piston, the counter biasing mechanism being configured to bias the spool toward one end of the pressure regulator in the axial direction by a pressure of the working fluid in the regulated-pressure chamber; and at least one of a first damping mechanism configured to damp a movement of the pilot piston and a second damping mechanism configured to damp a movement of the counter biasing piston.

9 Claims, 4 Drawing Sheets

(51) Int. Cl.
  *B60T 13/14* (2006.01)
  *G05D 16/04* (2006.01)
  *G05D 16/10* (2006.01)
  *B60T 7/04* (2006.01)
  *B60T 13/66* (2006.01)
  *B60T 13/68* (2006.01)

(52) U.S. Cl.
  CPC .......... *B60T 13/147* (2013.01); *B60T 13/662* (2013.01); *B60T 13/686* (2013.01); *G05D 16/04* (2013.01); *G05D 16/10* (2013.01)

(58) Field of Classification Search
  CPC ...... B60T 13/147; B60T 13/167; B60T 11/16; B60T 11/28; F16K 11/06
  USPC ............................ 303/10, 114.1, 115.1, 115.2
  See application file for complete search history.

(56) References Cited

U.S. PATENT DOCUMENTS

| | | | |
|---|---|---|---|
| 5,711,584 A | 1/1998 | Kawahata | |
| 6,196,642 B1* | 3/2001 | Sekiguchi | B60T 8/4072 303/115.4 |
| 6,685,280 B1* | 2/2004 | Yoshino | B60T 7/04 303/119.2 |
| 8,657,388 B2 | 2/2014 | Drumm et al. | |
| 2011/0285199 A1 | 11/2011 | Ishida | |
| 2014/0026557 A1 | 1/2014 | Ohnishi et al. | |
| 2014/0265546 A1* | 9/2014 | Shimizu | B60T 8/4077 303/20 |
| 2015/0015059 A1 | 1/2015 | Kamiya et al. | |
| 2015/0021980 A1 | 1/2015 | Kamiya et al. | |
| 2015/0107241 A1* | 4/2015 | Okano | B60T 8/367 60/545 |
| 2015/0175145 A1 | 6/2015 | Nakata et al. | |
| 2015/0291139 A1 | 10/2015 | Isono | |
| 2015/0321652 A1 | 11/2015 | Maruyama et al. | |
| 2016/0052498 A1* | 2/2016 | Isono | B60T 7/042 303/115.2 |
| 2016/0053907 A1* | 2/2016 | Isono | B60T 13/167 303/10 |
| 2016/0121866 A1* | 5/2016 | Ozeki | B60T 7/042 303/15 |
| 2016/0200301 A1* | 7/2016 | Kamiya | B60T 8/4077 303/115.1 |

OTHER PUBLICATIONS

U.S. Appl. No. 14/810,976 issued on Jul. 28, 2015 for Isono.
May 10, 2016 Office Action issued in U.S. Appl. No. 14/810,839.
Sep. 8, 2016 Office Action issued in U.S. Appl. No. 14/810,976.
Dec. 14, 2016 Office Action Issued in U.S. Appl. No. 14/810,976.

* cited by examiner

PRESSURE REGULATOR AND HYDRAULIC BRAKE SYSTEM FOR VEHICLE EQUIPPED WITH THE SAME

CROSS REFERENCE TO RELATED APPLICATION

The present application claims priority from Japanese Patent Application Nos. 2014-168246 and 2014-168249 which were filed on Aug. 21, 2014 and No. 2014-206991 which was filed on Oct. 8, 2014, the disclosure of which is herein incorporated by reference in its entirety.

BACKGROUND OF THE INVENTION

Field of the Invention

The present invention relates to a pressure regulator configured to regulate a pressure of a working fluid supplied from a high-pressure source and also relates to a hydraulic brake system for a vehicle including the pressure regulator.

Description of the Related Art

In the field of a vehicle hydraulic brake system, a system is known in which a brake device generates a braking force depending not on a brake operation force but mainly on a pressure of a working fluid supplied from a high-pressure source. In the system, a pressure regulator is used for regulating the pressure of the working fluid supplied from the high-pressure source. In a system described in the following Patent Literature 1 which is one example of such a system, there is provided a pressure regulator for regulating a pressure of a working fluid by a pilot pressure.

Patent Literature 1: JP-A-2013-227016

SUMMARY OF THE INVENTION

In the pressure regulator described in the above Patent Literature, the pressure of the working fluid supplied from the high-pressure source is regulated by a valve mechanism of the so-called poppet type. The poppet valve mechanism is configured to regulate the working fluid such that a valve member is seated on and separated away from a valve seat. In the poppet valve mechanism, a clearance between the valve member and the valve seat formed when the valve member is separated away from the valve seat is relatively large, and the poppet valve mechanism thus may suffer from troubles. For instance, foreign matters may be caught. In a valve mechanism of a spool type, in contrast, a clearance is made small between a spool and an element which movably holds the spool and which has an inner port facing an outer circumference of the spool. (The element may be hereinafter referred to as "spool holding member" where appropriate.) Such a spool valve mechanism is unlikely to suffer from the troubles experienced in the poppet valve mechanism. For instance, the foreign matters are unlikely to be caught. It is therefore an object of the invention to provide a practical pressure regulator including a spool valve mechanism. It is also an object of the invention to provide a practical hydraulic brake system for a vehicle having such a pressure regulator.

The invention provides a pressure regulator including: (a) a biasing mechanism configured to bias a spool of a spool valve mechanism toward an end of the pressure regulator by a pilot piston to which is applied a pilot pressure; and (b) a counter biasing mechanism configured to bias the spool toward another end of the pressure regulator by a counter biasing piston to which is applied a pressure of the working fluid supplied from the pressure regulator, wherein the pressure regulator further includes at least one of a damping mechanism configured to damp a movement of the pilot piston and a damping mechanism configured to damp a movement of the counter biasing piston.

The invention also provides a hydraulic brake system for a vehicle, including: a brake operation member; a brake device provided for a wheel; a master cylinder device configured to pressurize a working fluid to a pressure in accordance with a pressure of the working fluid introduced thereto and configured to supply the pressurized working fluid to the brake device; a high-pressure-source device configured to supply a working fluid having a high pressure; a pressure adjusting device configured to be controlled so as to adjust a pressure of the working fluid to a given pressure; and the pressure regulator of the present invention described above, wherein the pilot pressure is made equal to the pressure of the working fluid supplied from the pressure adjusting device, and the working fluid whose pressure is regulated by the pressure regulator is introduced to the master cylinder device.

The pressure regulator constructed according to the invention includes a spool valve mechanism and is thus excellent in various aspects. For instance, foreign matters are unlikely to be caught. In the present pressure regulator, the movement of at least one of the pilot piston and the counter biasing piston that are configured to bias the spool is damped. Consequently, the spool valve mechanism does not respond, to an excessive extent, to a change in the pilot pressure and a change in a pressure of the working fluid supplied from the pressure regulator (hereinafter referred to as "regulated pressure" where appropriate), so that pressure regulation can be properly conducted. Further, the hydraulic brake system for a vehicle including the pressure regulator constructed as described above can generate an appropriate braking force.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

In the following forms, the form (1) corresponds to claim 1. A form in which the matters to define the invention of the forms (2) and (5) are collectively added to claim 1 corresponds to claim 2. A form in which the matters to define the invention of the forms (3) and (6) are collectively added to claim 2 corresponds to claim 3. A form in which the matters to define the invention of the forms (4) and (7) are collectively added to claim 3 corresponds to claim 4. A form in which the matter to define the invention of the form (8) is added to any one of claims 1-4 corresponds to claim 5. A form in which the matter to define the invention of the form (9) is added to claim 5 corresponds to claim 6. A form in which the matter to define the invention of the form (10) is added to any one of claims 1-6 corresponds to claim 7. A hydraulic brake system for a vehicle of the form (21) equipped with a pressure regulator according to any [one] of claims 1-7 corresponds to claim 8. A hydraulic brake system for a vehicle of the form of the form (22) to which the matter to define the invention of the form (7) is added corresponds to claim 9.

(1) A pressure regulator configured to regulate a working fluid having a high pressure and supplied from a high-pressure source, to a regulated pressure by a pilot pressure and configured to supply the pressure-regulated working fluid, comprising:
  a housing;
  a high-pressure port to which is supplied the working fluid supplied from the high-pressure source, a low-pressure port which is to communicate with a low-pressure source, and a regulated-pressure port for supplying the pressure-regulated working fluid, the high-pressure port, the low-pressure port, and the regulated-pressure port being provided on the housing;
  a spool valve mechanism provided in the housing and having a spool configured to be movable in an axial direction of the pressure regulator, the spool valve mechanism being configured such that, when the spool is located at an end position in a movable range thereof that is nearer to one end of the pressure regulator in the axial direction, communication between the low-pressure port and the regulated-pressure port is allowed while communication between the high-pressure port and the regulated-pressure port is shut off and such that, when the spool is moved toward the other end of the pressure regulator in the axial direction, the communication between the low-pressure port and the regulated-pressure port is shut off while the communication between the high-pressure port and the regulated-pressure port is allowed;
  a biasing mechanism provided in the housing on one of opposite sides of the spool nearer to the one end of the pressure regulator and including a pilot-pressure chamber to which is introduced a working fluid having the pilot pressure and a pilot piston configured to push the spool toward the other end of the pressure regulator by the pressure of the working fluid in the pilot-pressure chamber applied to the pilot piston, the biasing mechanism being configured to bias the spool toward the other end of the pressure regulator by the pressure of the working fluid in the pilot-pressure chamber;
  a counter biasing mechanism provided in the housing on the other of the opposite sides of the spool nearer to the other end of the pressure regulator and having a regulated-pressure chamber which communicates with the regulated-pressure port and to which is introduced the working fluid having the regulated pressure and a counter biasing piston configured to push the spool toward the one end of the pressure regulator by the pressure of the working fluid in the regulated-pressure chamber applied to the counter biasing piston, the counter biasing mechanism being configured to bias the spool toward the one end of the pressure regulator by the pressure of the working fluid in the regulated-pressure chamber; and
  at least one of a first damping mechanism configured to damp a movement of the pilot piston and a second damping mechanism configured to damp a movement of the counter biasing piston.

The pressure regulator according to this form is of the so-called spool valve mechanism. The spool valve mechanism is configured to bring the regulated-pressure port into communication with selectively one of the high-pressure port and the low-pressure port by a movement of the spool held by a spool holding member in the axial direction. In general, no seals are provided between the spool and the spool holding member. Instead, a clearance therebetween is made considerably small, thereby achieving the sealing function. Consequently, the present pressure regulator is less likely to suffer from a risk that foreign matters are caught between the spool and the spool holding member. In this respect, the spool valve mechanism is advantageous over the so-called poppet valve mechanism.

The spool valve mechanism regulates the pressure of the working fluid by moving the spool in the axial direction owing to a balance between the biasing force by the biasing mechanism and the biasing force by the counter biasing mechanism. Because the spool is moved by a relatively small biasing force, it is expected that variations in the two biasing forces cause an excessive movement of the spool and accordingly, a pressure regulating operation excessively responds. In other words, it is expected that the spool valve mechanism excessively responds to variations in the pilot pressure and the regulated pressure and operates in a self-induced vibrating manner.

In the pressure regulator according to this form, the movement of at least one of the pilot piston and the counter biasing piston is damped by at least one of the first damping mechanism and the second damping mechanism, so that the above-indicated excessive response of the spool valve mechanism is prevented. As a result, proper controllability of the pressure regulator is ensured. That is, the pressure regulator of this form achieves proper pressure regulation of the working fluid.

The term "to damp the movement" in this form means, in short, to give resistance to the movement, for instance. Resistance may be given to the movement of the pilot piston or the counter biasing piston (hereinafter collectively referred to as "piston" where appropriate) in a manner explained later. That is, resistance may be given by giving resistance to a flow of the working fluid. Alternatively, where the piston is configured to slide in the housing, resistance may be given by increasing friction between sliding surfaces of the piston and the housing. Specifically, a form in which resistance is given to the movement of the piston by utilizing a frictional force caused by a seal member provided between the piston and the housing is one form of the first damping mechanism or the second damping mechanism, in a broad sense. (The first damping mechanism and the second damping mechanism may be hereinafter collectively referred to as "damping mechanism" where appropriate.) While the piston is configured to be movable in mutually opposite directions in the axial direction, namely, movable toward both of the one end and the other end of the pressure regulator, resistance may be given to the movement in both of the opposite directions or may be given only to the movement in one direction.

(2) The pressure regulator according to the form (1), comprising at least the first damping mechanism,
  wherein the first damping mechanism includes:
    a first opposing chamber provided on one of opposite sides of a portion of the pilot piston remote from the pilot-pressure chamber, a volume of the first opposing chamber changing in accordance with the movement of the pilot piston; and
    a first resistance giving mechanism configured to give resistance to at least one of an inflow of the working fluid into the first opposing chamber and an outflow of the working fluid from the first opposing chamber, the inflow and the outflow depending on a change in the volume of the first opposing chamber.

In this form and the following two forms, limitations are added to actions and functions of the first damping mechanism. In this form, the movement of the piston is damped by giving resistance to the flow of the working fluid that depends on the movement of the piston. According to this form, it is easy to construct the resistance giving mechanism such that larger resistance is given with an increase in a speed of the flow of the working fluid, for instance. That is, the higher the speed of the flow of the working fluid, the larger the resistance. In other words, it is easy to construct the damping mechanism such that larger damping force is generated with respect to the movement of the piston with an increase in a speed of the movement of the piston. That is, the higher the speed of the movement of the piston, the larger the damping force. In an instance where the movement of the piston is damped by increasing friction between the sliding surfaces of the piston and the housing, it is expected that resistance becomes large at the time of initiation of the movement of the piston by the biasing force of the biasing mechanism or the counter biasing mechanism, resulting in excessive deterioration of response. According to the resistance giving mechanism constructed as described above, in contrast, resistance at the time of initiation of the movement can be made small while a large resistance is given to the movement whose speed is high. It is thus possible to achieve a pressure regulator that ensures good response and good controllability.

(3) The pressure regulator according to the form (2), wherein the first resistance giving mechanism includes an orifice provided in a communication passage that communicates with the low-pressure source so as to permit the inflow of the working fluid into the first opposing chamber and the outflow of the working fluid from the first opposing chamber.

This form is a limitation to a specific structure for giving resistance to the flow of the working fluid that depends on the movement of the piston. According to this form that employs the orifice, it is possible to achieve, in a simple structure, the resistance giving mechanism configured to give larger resistance with an increase in the speed of the flow of the working fluid.

(4) The pressure regulator according to the form (3), wherein the first resistance giving mechanism includes a check valve provided in the communication passage for disabling a function of the orifice with respect to one of the inflow of the working fluid into the first opposing chamber and the outflow of the working fluid from the first opposing chamber.

In short, this form may be regarded as a form in which the resistance giving mechanism gives resistance substantially only to the flow of the working fluid in one direction. In an instance where the resistance giving mechanism is constructed such that resistance is given only to the outflow of the working fluid from the opposing chamber while resistance is not given to the inflow of the working fluid into the opposing chamber, for example, the pressure of the opposing chamber is prevented from becoming a negative pressure. As a result, aeration that arises from the negative pressure is avoided, and vibration damping characteristics, i.e., characteristics for preventing vibration, are enhanced. This form is particularly effective in a case in which the pressure regulator includes both of the first damping mechanism and the second damping mechanism and the pressure regulator is configured not to give resistance to the inflow of the working fluid into the opposing chamber of each damping mechanism.

(5) The pressure regulator according to any one of the forms (1)-(4), comprising at least the second damping mechanism,
wherein the second damping mechanism includes:
a second opposing chamber provided on one of opposite sides of a portion of the counter biasing piston remote from the regulated-pressure chamber, a volume of the second opposing chamber changing in accordance with the movement of the counter biasing piston; and
a second resistance giving mechanism configured to give resistance to at least one of an inflow of the working fluid into the second opposing chamber and an outflow of the working fluid from the second opposing chamber, the inflow and the outflow depending on a change in the volume of the second opposing chamber.

(6) The pressure regulator according to the form (5), wherein the second resistance giving mechanism includes an orifice provided in a communication passage that communicates with the low-pressure source so as to permit the inflow of the working fluid into the second opposing chamber and the outflow of the working fluid from the second opposing chamber.

(7) The pressure regulator according to the form (6), wherein the second resistance giving mechanism includes a check valve provided in the communication passage for disabling a function of the orifice with respect to one of the inflow of the working fluid into the second opposing chamber and the outflow of the working fluid from the second opposing chamber.

In the above three forms, limitations are added to actions and functions of the second damping mechanism. These three forms have actions and advantages similar to those explained above with respect to the first damping mechanism, and explanation thereof is dispensed with.

(8) The pressure regulator according to any one of the forms (1)-(7),
wherein the pilot piston has a rod portion that extends toward the other end of the pressure regulator, and the spool has a blind hole that is open at one end portion thereof nearer to the one end of the pressure regulator, and
wherein the rod portion is configured such that a distal end thereof is to engage with the spool at a bottom wall of the blind hole.

According to this form, the biasing force by the pilot piston easily acts on the center of the cross section of the spool by permitting the axis of the rod portion and the axis of the spool to coincide with each other. In the pressure regulator according to this form, the pilot piston and the spool are disposed such that the rod portion of the pilot piston is inserted in the blind hole of the spool. It is thus possible to reduce a total dimension of the rod portion and the spool in the axial direction, achieving the pressure regulator that is relatively compact in size.

(9) The pressure regulator according to the form (8), wherein the bottom wall of the blind hole has a tapered shape, and the distal end of the rod portion of the pilot piston has a curved convex shape.

In the pressure regulator according to this form, the biasing force of the pilot piston can be applied to the spool in the axial direction, namely, can be applied straightforward with respect to the spool even if the axis of the pilot piston is inclined.

(10) The pressure regulator according to any one of the forms (1)-(9), wherein, where the biasing mechanism is defined as a first biasing mechanism, the pilot pressure is defined as a first pilot pressure, and the pilot-pressure chamber is defined as a first-pilot-pressure chamber, the pressure regulator further comprises a second biasing mechanism provided in the housing on the one of the opposite sides of the spool nearer to the one end of the pressure regulator and having a second-pilot-pressure chamber to which is introduced a working fluid having a second pilot pressure different from the first pilot pressure, the second biasing mechanism being configured to bias the spool toward the other end of the pressure regulator by the pressure of the working fluid in the second-pilot-pressure chamber.

The pressure regulator according to this four includes two biasing mechanisms by the two pilot pressures (hereinafter each referred to as "pilot biasing mechanism" where appropriate). The two pilot biasing mechanisms may be disposed in parallel to each other or may be disposed in series as later explained. The two biasing mechanisms may operate simultaneously so as to bias the spool simultaneously. Alternatively, the two biasing mechanisms may be configured not to operate simultaneously, and only selected one of the two biasing mechanisms may bias the spool as later explained. The pressure of the working fluid can be regulated by the two pilot pressures, so that the pressure regulator ensures a wide range of uses.

(11) The pressure regulator according to the form (10),
wherein, when the first biasing mechanism biases the spool, the second biasing mechanism is prohibited from biasing the spool, and
wherein, when the first biasing mechanism is disabled from biasing the spool, the second biasing mechanism is allowed to bias the spool.

In the pressure regulator according to this form, pressure regulation by any one of the two pilot pressures is selectively conducted. In other words, the second biasing mechanism has a function of backing up the first biasing mechanism. Use of the pressure regulator according to this form achieves a system in which pressure regulation by the second pilot pressure is conducted in an instance where the first pilot pressure cannot be generated due to some reasons, for example. In other words, it is possible to achieve the system excellent in terms of fail safe.

(12) The pressure regulator according to the form (10) or (11), wherein the first biasing mechanism and the second biasing mechanism are disposed in series, and the second biasing mechanism is configured to bias the spool toward the other end of the pressure regulator via the pilot piston of the first biasing mechanism.

This form is preferably employed in the above-indicated form in which the two pilot biasing mechanisms selectively operate. In an instance where the movement of the pilot piston of the first biasing mechanism is damped by the first damping mechanism, excessive response is prevented also with respect to the biasing force of the second biasing mechanism, so that good pressure regulation by the second biasing mechanism is expected.

(21) A hydraulic brake system for a vehicle, comprising:
a brake operation member;
a brake device provided for a wheel of the vehicle;
a master cylinder device to which is introduced the pressure-regulated working fluid, the master cylinder device being configured to pressurize a working fluid to a pressure in accordance with a pressure of the working fluid introduced thereto and configured to supply the pressurized working fluid to the brake device;
a high-pressure-source device, as the high-pressure source, configured to supply a working fluid having the high pressure;
a pressure adjusting device configured to be controlled so as to adjust a pressure of a working fluid to a given pressure; and
the pressure regulator defined in any one of the forms (1)-(12),
wherein the working fluid supplied from the pressure adjusting device is introduced to the pilot-pressure chamber as the working fluid having the pilot pressure, and the working fluid whose pressure is regulated by the pressure regulator is introduced to the master cylinder device.

In short, the hydraulic brake system according to this form employs the pressure regulator in various forms described above. The system of this form makes the most of the advantages of the pressure regulator in the above-indicated various forms, thus enabling good control of the braking force to be generated by the brake device.

(22) The hydraulic brake system according to the form (21),
wherein the pressure regulator is the pressure regulator defined in any one of the forms (10)-(12), and
wherein one of a working fluid having a pressure in accordance with a brake operation force applied to the brake operation member and the working fluid supplied from the master cylinder device to the brake device is introduced to the second-pilot-pressure chamber as the working fluid having the second pilot pressure.

The hydraulic brake system of this form includes the pressure regulator capable of conducting pressure regulation by the two pilot pressures. According to the system of this form, in the normal condition, the pressure regulator conducts pressure regulation utilizing, as the first pilot pressure, the pressure of the working fluid adjusted by the pressure adjusting device. In an instance where the pressure adjusting device fails to operate due to electric failure or the like, the pressure regulator may conduct pressure regulation utilizing, as the second pilot pressure, a pressure of the working fluid having a level in accordance with the brake operation force (hereinafter referred to as "operation-force dependent pressure" where appropriate) or a pressure of the working fluid to be supplied form the master cylinder device to the brake device (hereinafter referred to as "master pressure" where appropriate). The thus constructed hydraulic brake system has a high reliability.

BRIEF DESCRIPTION OF THE DRAWINGS

The objects, features, advantages, and technical and industrial significance of the claimable invention will be better understood by reading the following detailed description of embodiments of the claimable invention, when considered in connection with the accompanying drawings, in which:

DETAILED DESCRIPTION OF THE EMBODIMENTS

Figure 1:
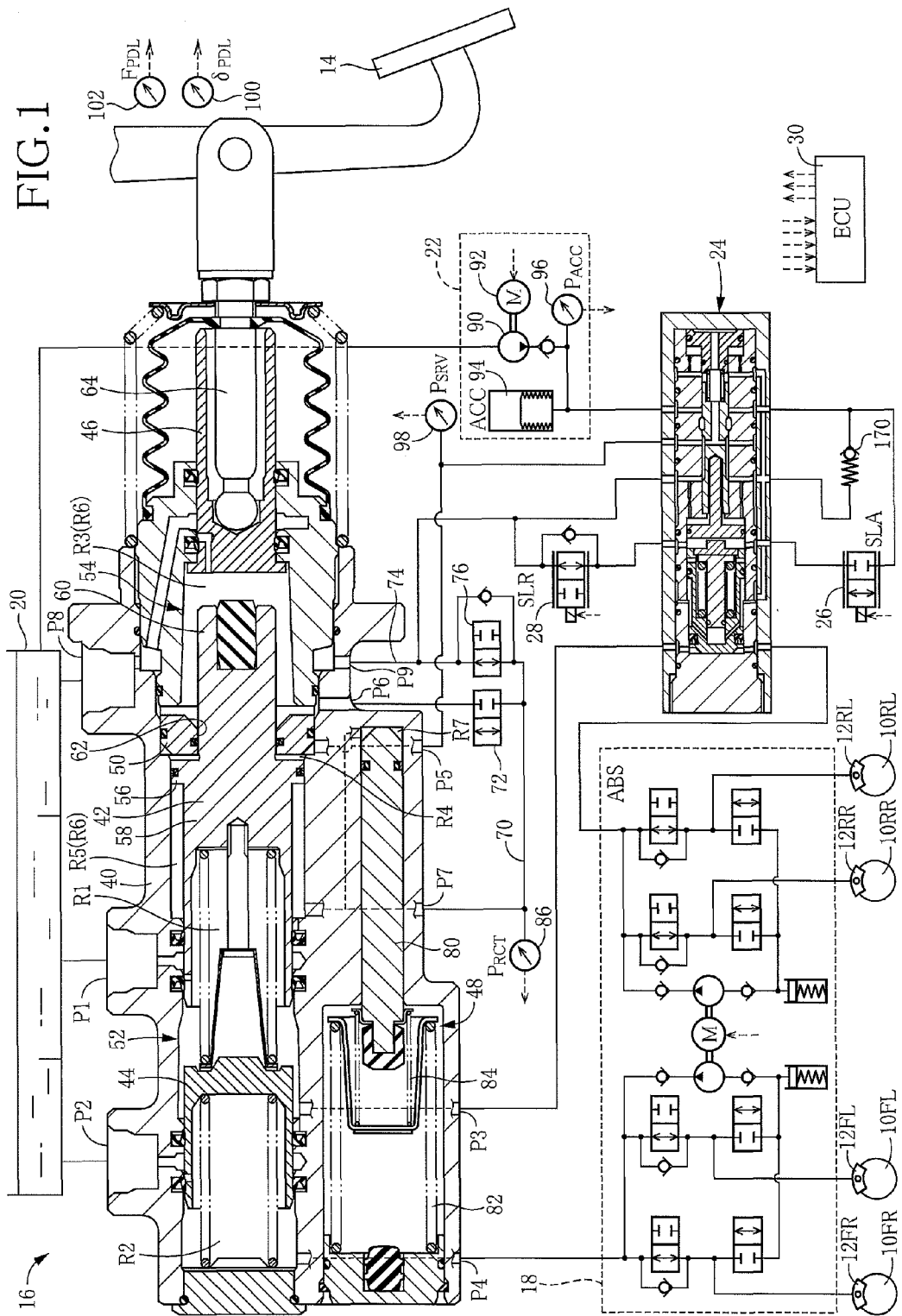
FIG. 1 is a view showing an overall structure of a hydraulic brake system for a vehicle according to a first embodiment.

Referring to the drawings, there will be explained below in detail embodiments and a modified example of the claimable invention. It is to be understood that the claimable invention is not limited to the details of the following embodiments and modified examples thereof and the forms described in Forms of the Invention, but may be embodied with other changes and modifications based on the knowledge of those skilled in the art.

Embodiment 1

Structure of Hydraulic Brake System for Vehicle

1. Overall Structure

A hydraulic brake system for a vehicle according to a first embodiment is installed on hybrid vehicles in which a brake oil is used as a working fluid. As shown in FIG. 1, the present hydraulic brake system generally includes (A) four brake devices 12 which are provided for respective four wheels 10 and each of which is configured to generate a braking force, (B) a master cylinder device 16 to which is input an operation of a brake pedal 14 as a brake operation member and which is configured to supply a pressurized working fluid to each brake device 12, (C) an antilock unit 18, as an ABS device, disposed between the master cylinder device 16 and the four brake devices 12, (D) a high-pressure-source device 22, as a high-pressure source, configured to pump up the working fluid from a reservoir 20 as a low-pressure source and to pressurize the pumped fluid, so as to supply the working fluid that is highly pressurized, (E) a regulator 24, as a mechanical pressure regulator, configured to regulate a pressure of the working fluid supplied from the high-pressure-source device 22 and to supply, to the master cylinder device 16, the working fluid whose pressure is regulated, (F) an electromagnetic pressure-increase linear valve 26 and an electromagnetic pressure-decrease linear valve 28 (hereinafter simply referred to as "pressure-increase linear valve 26" and "pressure-decrease linear valve 28", respectively, where appropriate) for adjusting a pressure of the working fluid supplied to the regulator 24, and (G) a brake electronic control unit 30, as a controller, configured to control the hydraulic brake system by controlling the devices, equipment, valves, and so on. It is noted that the antilock unit 18 may be referred to as "ABS unit 18" where appropriate and a sign "ABS" is attached in FIG. 1. The pressure-increase linear valve 26 and the pressure-decrease linear valve 28 are respectively marked with signs "SLA" and "SLR" in FIG. 1. The brake electronic control unit 30 may be referred to as "brake ECU 30" where appropriate and is marked with a sign "ECU" in FIG. 1. Where it is necessary to distinguish the four wheels 10 in terms of "front", "rear", "right", and "left", the four wheels 10 are indicated as a front right wheel 10FR, a front left wheel 10FL, a rear right wheel 10RR, and a rear left wheel 10RL, respectively. Where it is necessary to similarly distinguish the constituent elements, the same suffixes as used for the wheels 10 are used. For instance, the four brake devices 12 are indicated as 12FR, 12FL, 12RR, and 12RL, respectively, where necessary.

2. Brake Device and ABS Unit

Each of the brake devices 12 provided for the respective wheels 10 is a disc brake device including a disc rotor that rotates together with the wheel 10, a caliper held by a carrier, a wheel cylinder held by the caliper, and brake pads held by the caliper and configured to be moved by the wheel cylinder so as to sandwich the disc rotor. The ABS unit 18 is a unit constituted by four pairs of open/close valves corresponding to the four wheels 10, a pump device, and so on. One of the open/close valves in each pair is a pressure-increase open/close valve while the other of the open/close valves in each pair is a pressure-decrease open/close valve. The ABS unit 18 is configured to be activated when the wheels 10 are locked due to skidding or the like, so as to prevent the lock of the wheels 10 from being continued. Each brake device 12 and the ABS unit 18 are an ordinary device and an ordinary unit and have low relevance to the features of the claimable invention. Accordingly, a detailed explanation of the brake devices 12 and the ABS unit 18 is dispensed with.

3. Master Cylinder Device

The master cylinder device 16 is a master cylinder device in which a stroke simulator is integrally incorporated. In general, the master cylinder device 16 has a housing 40 in which two pressurizing pistons, i.e., a first pressurizing piston 42 and a second pressurizing piston 44, and an input piston 46 are disposed, and a stroke simulator mechanism 48 is incorporated in the housing 40. In the following explanation about the master cylinder device 16, a leftward direction and a rightward direction in FIG. 1 are respectively referred to as a forward direction and a rearward direction for the sake of convenience. Similarly, a leftward movement and a rightward movement of the pistons, etc., explained below are respectively referred to as a forward or advancing movement and a rearward or retracting movement.

The housing 40 has a space in which are accommodated the first pressurizing piston 42, the second pressurizing piston 44, and the input piston 46. The space is closed at its front-side end and is partitioned by an annular partition portion 50 into a front-side chamber 52 and a rear-side chamber 54. The second pressurizing piston 44 has a cylindrical shape which is open on its front side and closed on its rear side. The second pressurizing piston 44 is disposed at a frond-side portion of the front-side chamber 52. The first pressurizing piston 42 has a cylindrical shape having a closed end and includes: a main body portion 58 having a flange 56 formed at a rear end of the main body portion 58; and a protruding portion 60 that extends rearward from the main body portion 58. The main body portion 58 is disposed in the front-side chamber 52 so as to be located rearward of the second pressurizing piston 44. The annular partition portion 50 has an opening 62 at its central portion, and the protruding portion 60 extends into the rear-side chamber 54 through the opening 62. The input piston 46 is disposed in the rear-side chamber 54 such that the input piston 46 partially extends into the rear-side chamber 54 from the rear side. The brake pedal 14 disposed on the rear side of the input piston 46 is connected to the input piston 46 via a link rod 64.

A first pressurizing chamber R1 is formed between the first pressurizing piston 42 and the second pressurizing piston 44, more specifically, on the front side of the main body portion 58 of the first pressurizing piston 42. In the first pressurizing chamber R1, the working fluid to be supplied to the two brake devices 12RR, 12RL corresponding to the respective two rear wheels 10RR, 10RL is pressurized by a forward movement of the first pressurizing piston 42. Further, a second pressurizing chamber R2 is formed on the front side of the second pressurizing piston 44. In the second pressurizing chamber R2, the working fluid to be supplied to the brake devices 12FR, 12FL corresponding to the respective two front wheels 10FR, 10FL is pressurized by a forward movement of the second pressurizing piston 44. Further, an inter-piston chamber R3 is formed between the first pressurizing piston 42 and the input piston 46. More specifically, the inter-piston chamber R3 is formed such that a rear end of the protruding portion 60 that extends rearward from the opening 62 formed in the partition portion 50 and a front end of the input piston 46 face to each other, namely, such that the first pressurizing piston 42 and the input piston 46 face to each other utilizing the opening 62. Further, in the front-side chamber 52 of the housing 40, there are formed: an annular input chamber R4 to which the working fluid supplied from the regulator 24 is input; and an annular opposing chamber R5. More specifically, the input chamber R4 is formed around an outer circumference of the protruding portion 60 so as to be defined by a front end face of the partition portion 50 and a rear end face of the main body portion 58 of the first pressurizing piston 42, i.e., a rear end face of the flange 56. The opposing chamber R5 is formed forward of the flange 56 around an outer circumference of the main body portion 58 such that the opposing chamber R5 is opposed to the input chamber R4 with the flange 56 interposed therebetween.

The first pressurizing chamber R1 is fluidly communicable with the reservoir 20 via an atmospheric-pressure port P1 when the first pressurizing piston 42 is located at a rear end position in its movement range while the second pressurizing chamber R2 is fluidly communicable with the reservoir 20 via an atmospheric-pressure port P2 when the second pressurizing piston 44 is located at a rear end position in its movement range. The first pressurizing chamber R1 and the second pressurizing chamber R2 communicate with the brake devices 12 via respective output ports P3, P4 and via the ABS unit 18. In this respect, the first pressurizing chamber R1 communicates with the brake devices 12RR, 12RL also via the regulator 24 (that will be later explained). Further, the input chamber R4 communicates with a regulated-pressure port of the regulator 24 (that will be later explained) via an input port P5.

The inter-piston chamber R3 communicates with a communication port P6 while the opposing chamber R5 communicates with a communication port P7. The communication port P6 and the communication port P7 are connected by an inter-chamber communication passage 70 as an external communication passage. At a certain position in the inter-chamber communication passage 70, there is provided a normally closed electromagnetic open/close valve 72, namely, an open/close valve 72 configured to be closed in a non-energized state and opened in an energized state. When the open/close valve 72 is placed in an open state, the inter-piston chamber R3 and the opposing chamber R5 are brought into communication with each other. In a state in which the inter-piston chamber R3 and the opposing chamber R5 are held in communication with each other, the chambers R3, R5 define one fluid chamber. That is, a fluid chamber that may be referred to as a reaction-force chamber R6 is defined. The open/close valve 72 has a function of switching a communication state of the inter-piston chamber R3 and the opposing chamber R5 between a communicating state and a non-communicating state. In view of this, the open/close valve 72 will be hereinafter referred to as "inter-chamber-communication switching valve 72".

The master cylinder device 16 has two more atmospheric-pressure ports P8, P9 that communicate with each other via an internal passage. The atmospheric-pressure port P8 is connected to the reservoir 20 while the atmospheric-pressure port P9 is connected, between the inter-chamber-communication switching valve 72 and the opposing chamber R5, to the inter-chamber communication passage 70 via an atmospheric-pressure release passage 74 as an external communication passage. In the atmospheric-pressure release passage 74, there is provided a normally open electromagnetic open/close valve 76, namely, an open/close valve 76 configured to be opened in a non-energized state and closed in an energized state. The open/close valve 76 has a function of releasing the opposing chamber R5 to the atmospheric pressure. In view of this, the open/close valve 76 will be hereinafter referred to as "atmospheric-pressure release valve 76" where appropriate.

The housing 40 has a space different from the space in which the first pressurizing piston 42, the second pressurizing piston 44, and the input piston 46 are disposed. The stroke simulator mechanism 48 is constituted by the space in question, a reaction-force piston 80 disposed in the space, and two reaction-force springs 82, 84 (both of which are compression coil springs) for biasing the reaction-force piston 80. On the rear side of the reaction-force piston 80, a buffer chamber R7 is formed. (In FIG. 1, the buffer chamber R7 is illustrated in an almost deflated or compressed state). When the input piston 46 moves forward by an operation of the brake pedal 14, the working fluid in the opposing chamber R5, i.e., the working fluid in the reaction-force chamber R6, is introduced into the buffer chamber R7 via an inner passage, and elastic reaction forces of the reaction-force springs 82, 84 in accordance with the introduced amount of the working fluid, namely, in accordance with the amount of the forward movement of the input piston 46, act on the reaction-force chamber R6, whereby an operation reaction force is applied to the brake pedal 14. That is, the stroke simulator mechanism 48 functions as a reaction-force applying mechanism for applying, to the input piston 46, a reaction force against the forward movement of the input piston 46 having a magnitude in accordance with the amount of the forward movement of the input piston 46. The two reaction-force springs 82, 84 are disposed in series, and the reaction-force spring 84 has a spring constant considerably smaller than that of the reaction-force spring 82. Thus, the stroke simulator mechanism 48 is configured to effectuate reaction-force characteristics in which an increase gradient of the reaction force becomes large from a certain point in the progress of the operation of the brake pedal 14 by inhibiting the reaction-force spring 84 from being deformed at the certain point in the progress of the operation of the brake pedal 14. In the present system, there is provided, in the inter-chamber communication passage 70, a reaction-force pressure sensor 86 for detecting a pressure of the working fluid in the reaction-force chamber R6 (reaction-force pressure). (In FIG. 1, the reaction-force pressure sensor 86 is marked with a sign "$P_{RCT}$" indicative of the reaction-force pressure.)

In a normal condition, the inter-chamber-communication switching valve 72 is in the open state while the atmospheric-pressure release valve 76 is in the closed state, and the reaction-force chamber R6 is defined by the inter-piston chamber R3 and the opposing chamber R5. In the present master cylinder device 16, a pressure receiving area (pressure receiving area with respect to the inter-piston chamber) of the first pressurizing piston 42 on which a pressure of the working fluid in the inter-piston chamber R3 acts for moving the first pressurizing piston 42 forward, namely, an area of a rear end face of the protruding portion 60 of the first pressurizing piston 42, is made equal to a pressure receiving area (pressure receiving area with respect to the opposing chamber) of the first pressurizing piston 42 on which a pressure of the working fluid in the opposing chamber R5 acts for moving the first pressurizing piston 42 rearward, namely, an area of a front end face of the flange 56 of the first pressurizing piston 42. Consequently, even if the input piston 46 is moved forward by operating the brake pedal 14, the first pressurizing piston 42 and the second pressurizing piston 44 do not move forward by an operation force, namely, by the pressure in the reaction-force chamber R6, and the working fluid pressurized by the master cylinder device 16 is not supplied to the brake devices 12. On the other hand, when a pressure of the working fluid from the high-pressure-source device 22 is introduced into the input chamber R4, the first pressurizing piston 42 and the second pressurizing piston 44 move forward in dependence on the pressure of the working fluid, and the working fluid pressurized in accordance with a pressure of the working fluid in the input chamber R4 is supplied to the brake devices 12. That is, according to the master cylinder device 16, there is effectuated, in the normal condition (the normal state), a state in which the braking force is generated depending on the high-pressure-source pressure, namely, a state in which the brake devices 12 generate the braking force having a magnitude that depends on the pressure of the working fluid supplied from the high-pressure-source device 22 to the master cylinder device 16, i.e., the pressure of the working fluid supplied from the regulator 24 to the master cylinder device 16, without depending on the operation force applied to the brake pedal 14.

The vehicle on which the present system is installed is a hybrid vehicle as described above, and a regenerative braking force is accordingly available. It is consequently needed for the brake devices 12 to generate a braking force that corresponds to a difference obtained by subtracting the regenerative braking force from a braking force that is determined based on the braking operation. The present system effectuates the above-indicated state in which the braking force is generated depending on the high-pressure-source pressure, so that the brake devices 12 can generate the braking force that does not depend on the brake operation force. Thus, the present system is a hydraulic brake system suitable for hybrid vehicles.

In the case of electric failure or the like, on the other hand, the inter-chamber-communication switching valve 72 is in the closed state, the atmospheric-pressure release valve 76 is in the open state, and the inter-piston chamber R3 is hermetically closed while the opposing chamber R5 is released to the atmospheric pressure. In this state, the operation force applied to the brake pedal 14 is transmitted to the first pressurizing piston 42 via the working fluid in the inter-piston chamber R3, so that the first pressurizing piston 42 and the second pressurizing piston 44 move forward. That is, there is effectuated a state in which the braking force is generated depending on the operation force, namely, a state in which the brake devices 12 generate the braking force having a magnitude that depends on the operation force applied to the brake pedal 14. When the inter-chamber-communication switching valve 72 is placed in the closed state, the atmospheric-pressure release valve 76 is placed in the open state, and the working fluid is introduced from the high-pressure-source device 22 into the input chamber R4, the first pressurizing piston 42 and the second pressurizing piston 44 are moved forward by both of: the pressure of the working fluid supplied from the high-pressure-source device 22 to the master cylinder device 16; and the operation force.

As a result, there is effectuated a state in which the braking force is generated depending on the operation force and the high-pressure-source pressure, namely, a state in which the brake devices 12 generate the braking force that depends on both of the operation force and the high-pressure-source pressure, namely, the braking force that is a sum of the braking force whose magnitude depends on the pressure of the working fluid supplied from the high-pressure-source device 22 to the master cylinder device 16 and the braking force whose magnitude depends on the operation force.

4. High-Pressure-Source Device

The high-pressure-source device 22 includes: a pump 90 configured to pump up the working fluid from the reservoir 20 and to pressurize the pumped working fluid; a motor 92 for driving the pump 90; and an accumulator 94 (that is marked with a sign "ACC" in FIG. 1) for accumulating the working fluid pressurized by the pump 90. The high-pressure-source device 22 is provided with a high-pressure-source pressure sensor 96 for detecting a pressure of the working fluid in the accumulator 94, namely, for detecting a pressure of the working fluid to be supplied. (The pressure will be hereinafter referred to as "high-pressure-source pressure $P_{ACC}$" where appropriate. That is, the pressure is the so-called "accumulator pressure".) In FIG. 1, the high-pressure-source pressure sensor 96 is marked with a sign "$P_{ACC}$" indicative of the high-pressure-source pressure.

5. Regulator

The regulator 24 which is a mechanical pressure regulator is a pressure regulator according to a first embodiment of the claimable invention. The regulator 24 will be explained in detail in terms of its structure and functions. Here, only an outline of the functions will be explained. In the regulator 24, a given pressure of the working fluid introduced thereinto is utilized as a pilot pressure. The regulator 24 regulates, to a level in accordance with the pilot pressure, the working fluid having the high-pressure-source pressure $P_{ACC}$ supplied from the high-pressure-source device 22, and supplies the pressure-regulated working fluid, namely, the working fluid having a regulated pressure (hereinafter referred to as "servo pressure $P_{SRV}$" where appropriate), to the input chamber R4 of the master cylinder device 16. In a supply fluid passage for the working fluid from the regulator 24 to the master cylinder device 16, there is provided a servo pressure sensor 98 for detecting the servo pressure. (In FIG. 1, the servo pressure sensor 98 is marked with a sign "$P_{SRV}$" indicative of the servo pressure.)

There are introduced, into the regulator 24, the working fluid having a first pilot pressure $P_{PLT1}$ and the working fluid having a second pilot pressure $P_{PLT2}$ each as the working fluid having the pilot pressure. As later explained, the working fluid having the first pilot pressure $P_{PLT1}$ is the working fluid whose pressure is adjusted by the pressure-increase linear valve 26 and the pressure-decrease linear valve 28 for controlling the braking force to be generated in the present system in the normal condition. The working fluid having the second pilot pressure $P_{PLT2}$ is the working fluid to be supplied from the master cylinder device 16 to the brake devices 12RL, 12RR respectively corresponding to the rear wheels 10RL, 10RR, namely, the working fluid having a master pressure $P_{MST}$.

In the regulator 24, pressure regulation by the first pilot pressure $P_{PLT1}$ and pressure regulation by the second pilot pressure $P_{PLT2}$ are selectively conducted. The pressure regulation by the first pilot pressure $P_{PLT1}$ is conducted in the normal condition while the pressure regulation by the second pilot pressure $P_{PLT2}$ is conducted in the event of failure of the pressure-increase linear valve 26 and/or the pressure-decrease linear valve 28, electric failure of the present system, and so on.

6. Pressure-Increase Linear Valve and Pressure-Decrease Linear Valve

The pressure-increase linear valve 26 and the pressure-decrease linear valve 28 are ordinary electromagnetic linear valves, and illustration of the structure thereof is dispensed with. The pressure-increase linear valve 26 is a normally closed electromagnetic linear valve disposed between the high-pressure-source device 22 and the regulator 24. With an increase in an energizing current supplied to a coil, an opening degree (e.g., a degree of easiness with which the valve changes from the closed state to the open state) becomes higher and a valve-opening pressure becomes higher. The pressure-decrease linear valve 28 is a normally open electromagnetic linear valve disposed between the regulator 24 and the reservoir 20 as the low-pressure source. With an increase in an energizing current supplied to a coil, an opening degree (e.g., a degree of easiness with which the valve changes from the closed state to the open state) becomes lower and a valve-opening pressure becomes higher.

The pressure-increase linear valve 26 and the pressure-decrease linear valve 28 are disposed in series with the regulator 24 interposed therebetween, specifically, with the first-pilot-pressure chamber of the regulator 24 interposed therebetween. The pressure of the working fluid in the first-pilot-pressure chamber can be controlled by controlling the energizing current supplied to each of the pressure-increase linear valve 26 and the pressure-decrease linear valve 28. In view of the functions of the pressure-increase linear valve 26 and the pressure-decrease linear valve 28, the pressure-increase linear valve 26 and the pressure-decrease linear valve 28 constitute a pressure adjusting device configured to adjust the pressure of the working fluid introduced into the first-pilot-pressure chamber to the first pilot pressure $P_{PLT1}$ having a given level.

7. Control System

Control of the present system, namely, brake control, is executed by the brake ECU 30. Roughly, the brake ECU 30 controls the high-pressure-source device 22, specifically, the brake ECU 30 controls the motor 92 of the high-pressure-source device 22, and further controls the pressure-increase linear valve 26 and the pressure-decrease linear valve 28. The brake ECU 30 is constituted by a computer as a main element and drive circuits (drivers) for driving the motor 92 of the high-pressure-source device 22, the pressure-increase linear valve 26, the pressure-decrease linear valve 28, and so on.

To the brake ECU 30, the following sensors are connected: the reaction-force pressure sensor 86 for detecting a reaction-force pressure $P_{RCT}$; the high-pressure-source pressure sensor 96 for detecting the high-pressure-source pressure $P_{ACC}$; and the servo pressure sensor 98 for detecting the servo pressure $P_{SRV}$. The pressures $P_{RCT}$, $P_{ACC}$, and $P_{SRV}$ are obtained as information necessary for the control. Further, the present system is provided with a brake operation amount sensor 100 for detecting a brake operation amount and a brake operation force sensor 102 for detecting a brake operation force. The brake operation amount and the brake operation force are obtained as operation information of the brake pedal 14 as the brake operation member. (In FIG. 1, the brake operation amount sensor 100 and the brake operation force sensor 102 are marked with a sign "$\delta_{PDL}$" indicative of the brake operation amount and a sign "$F_{PDL}$" indicative of the brake operation force, respectively.) These sensors 100, 102 are also connected to the brake ECU 30.

The control by the brake ECU 30 in the present system is executed based on the values detected by the sensors.

<Structure of Regulator>

Figure 2:
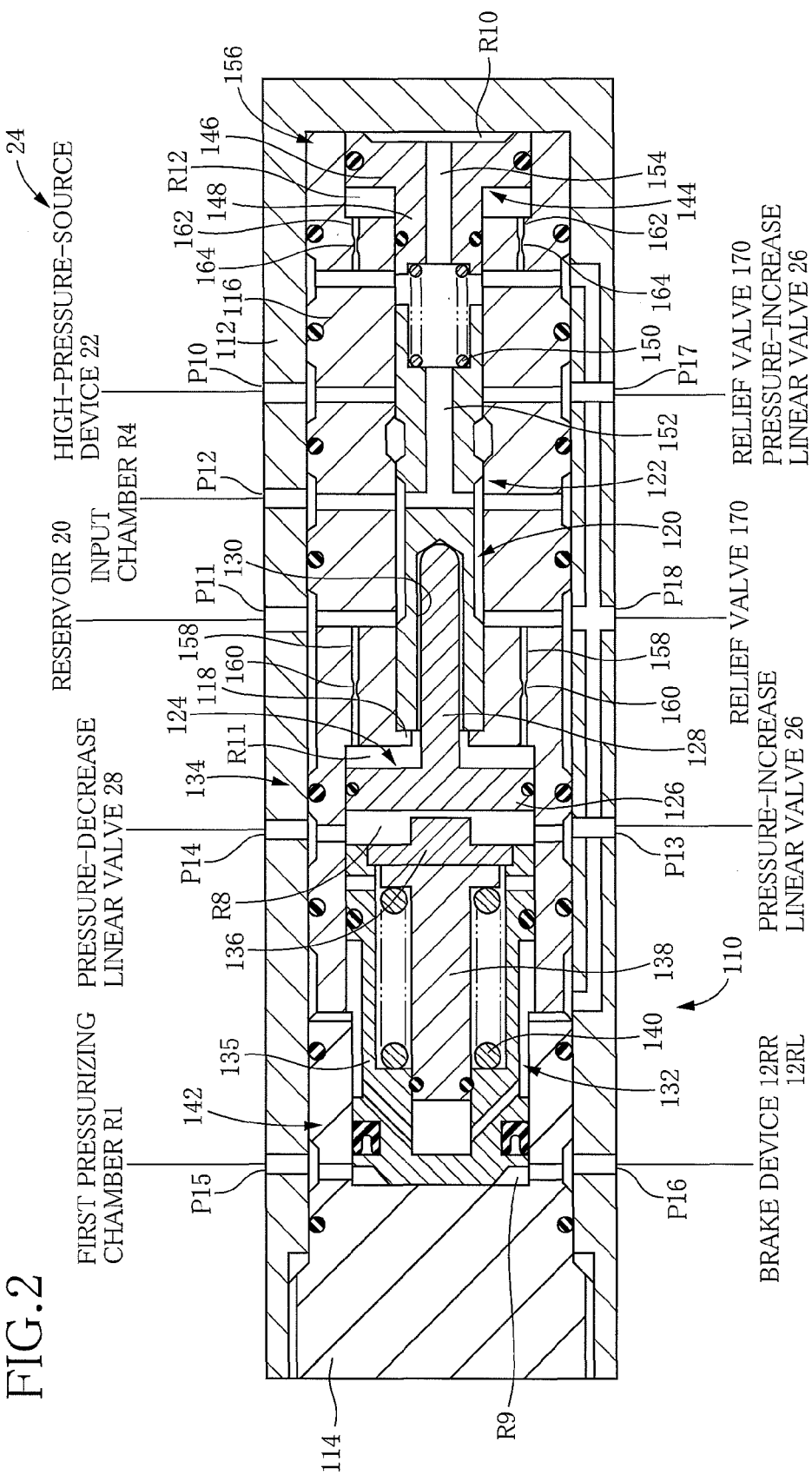
FIG. 2 is a cross-sectional view showing a pressure regulator according to the first embodiment.

As shown in FIG. 2, the regulator 24 as the pressure regulator according to the first embodiment is constituted by a housing 110 as a main constituent element and various members disposed in the housing 110. The center axis extending in the right-left direction in FIG. 2 is an axis of the housing 110, and the left side in FIG. 2 is refereed to as a one-end side while the right side in FIG. 2 is referred to as the other-end side. The one-end side corresponds to one end of the regulator 24 in the axial direction while the other-end side corresponds to the other end of the regulator 24 in the axial direction. In this respect, an end portion, in the axial direction, of constituent components of the regulator 24 located on the one-end side will be referred to as "one end portion" while another end portion, in the axial direction, of the constituent components located on the other-end side will be referred to as "the other end portion" where appropriate. The housing 110 is constituted by a housing body 112 having a cylindrical shape that is open at one end portion thereof located on the one-end side and a lid 114 screwed to the one end portion of the housing body 112 so as to close the opening. A spool holding sleeve 116 as a spool holding member is fitted in the housing body 112 and is fixed to the housing 112 by the lid 114. It may be considered that the spool holding sleeve 116 is a constituent element of the housing 110.

The spool holding sleeve 116 has, at its axially intermediate portion, a smaller inner diameter. A spool 120 is held by the spool holding sleeve 116 at the axially intermediate portion so as to be movable, specifically, slidable, in the axial direction. The housing 110 is provided with: a high-pressure port P10 to which the working fluid is supplied from the high-pressure-source device 22; an atmospheric-pressure port P11 as a low-pressure port which is to communicate with the reservoir 20 as the low-pressure source via the master cylinder device 16; and a regulated-pressure port P12 for supplying the pressure-regulated working fluid to the input chamber R4 of the master cylinder device 16. Three inner ports and an annular groove are formed on an inner circumferential surface of the spool holding sleeve 116. The three inner ports of the spool holding sleeve 116 communicate with the respective three ports P10, P11, P12 of the housing body 112 via respective inner passages formed in the housing body 112 and the spool holding sleeve 116. Two recesses for communication with the inner ports are formed on an outer circumferential surface of the spool 120. Depending on the position of the spool 120 in the axial direction, two inner ports that communicate with each other are changed.

Specifically, the spool 120 shown in FIG. 2 is located at a position defined by an engaging portion 118, in the form of an inward flange, which is provided at one end of the axially intermediate portion of the spool holding sleeve 116 on the one-end side. The position defined by the engaging portion 118 is a moving end position in the movable range on the one-end side. When the spool 120 is located at this position, communication between the atmospheric-pressure port P11 and the regulated-pressure port P12 is allowed while communication between the high-pressure port P10 and the regulated-pressure port P12 is shut off. When the spool 120 is moved from the moving end position to another moving end position on the other-end side, the communication between the atmospheric-pressure port P11 and the regulated-pressure port P12 is shut off while the communication between the high-pressure port P10 and the regulated-pressure port P12 is allowed. In view of such an action, a spool valve mechanism 122 is constituted in the regulator 24 by the spool 120 and the spool holding sleeve 116.

The spool holding sleeve 116 has a large inner diameter at one end portion thereof on the one-end side. In the one end portion of the spool holding sleeve 116, a first pilot piston 124 is disposed so as to be located on one of opposite sides of the spool 120 nearer to the one end of the regulator 24. The first pilot piston 124 has a main body portion 126 having a generally short cylindrical shape (a disc-like shape) and a rod portion 128 extending from the main body portion 126 toward the other-end side. The main body portion 126 is slidably held by the spool holding sleeve 116. The spool 120 has a blind hole 130 at one end portion thereof on the one-end side. The blind hole 130 is open toward the one-end side. The rod portion 128 is inserted in the blind hole 130 such that a distal end thereof engages with the bottom wall of the blind hole 130. The distal end of the rod portion 128 has a curved convex shape, specifically, a hemispherical shape while the bottom wall of the blind hole 130 has a tapered shape, specifically, a bowl-like shape, having a diameter that gradually decreases toward the other-end side.

A second pilot piston 132 is disposed on one of opposite sides of the first pilot piston 124 nearer to the one end of the regulator 24. A first-pilot-pressure chamber R8 is formed between the two pilot pistons 124, 132. The first-pilot-pressure chamber R8 communicates with first-pilot-pressure ports P13, P14 formed on the housing body 112 via respective inner passages. As apparent from FIG. 1, the first-pilot-pressure chamber R8 communicates with the pressure-increase linear valve 26 and the pressure-decrease linear valve 28 via the first-pilot-pressure port P13, P14, respectively. In this arrangement, the working fluid whose pressure is adjusted by the pressure-increase linear valve 26 and the pressure-decrease linear valve 28 is introduced to the first-pilot-pressure chamber R8 as the working fluid having the first pilot pressure $P_{PLT1}$.

The first pilot piston 124 pushes the spool 120 toward the other-end side by the pressure of the working fluid in the first-pilot-pressure chamber R8, namely, by an action of the first pilot pressure $P_{PLT1}$. That is, the first-pilot-pressure chamber R8 and the first pilot piston 124 define a first biasing mechanism 134 disposed on one of opposite sides of the spool 120 nearer to the one end of the regulator 24 and configured to bias the spool 120 toward the other-end side.

The second pilot piston 132 includes: a main body portion 135 having a generally cylindrical shape that is open at the other end portion thereof on the other-end side; and a lid 136 attached to the other end portion of the main body portion on the other-end side, so as to close the opening of the main body portion 135. The main body portion 135 is slidably held at one end portion thereof on the one-end side by a cylindrical portion of the lid 114 and is slidably held at the other end portion thereof on the other-end side by the spool holding sleeve 116. The second pilot piston 132 is configured to come into contact with the first pilot piston 124 at the other end portion thereof on the other-end side, namely, at a protruding portion of the lid 136 that protrudes toward the other-end side. A buffer piston 138 having a flange at the other end portion thereof on the other-end side is slidably held in the second pilot piston 132.

The second pilot piston 132 has an inner space communicating with the first-pilot-pressure chamber R8, and the inner space may be regarded as a part of the first-pilot-pressure chamber R8. The working fluid having the first pilot pressure $P_{PLT1}$ is introduced also into the inner space.

The buffer piston 138 is elastically supported by a buffer spring 140 which is a compression coil spring. In an instance where the first pilot pressure $P_{PLT1}$ abruptly changes, the buffer piston 138 allows a change in the volume of the first-pilot-pressure chamber R8 including the inner space indicated above, thereby mitigating an abrupt change of the biasing force to be applied to the spool 120 by the first pilot piston 124.

A second-pilot-pressure chamber R9 is defined by the lid 114 and one end portion of the second pilot piston 132 on the one-end side. The second-pilot-pressure chamber R9 communicates with second-pilot-pressure ports P15, P16 formed on the housing body 112 via respective inner passages. As apparent from FIG. 1, the second-pilot-pressure chamber R9 communicates with the first pressurizing chamber R1 of the master cylinder device 16 via the second-pilot-pressure port P15 and communicates with the brake devices 12RL, 12RR for the rear wheels via the second-pilot-pressure port P16. Thus, the second-pilot-pressure chamber R9 functions as a part of a supply passage for the working fluid from the master cylinder device 16 to the brake devices 12RL, 12RR, and the working fluid having the master pressure $P_{MST}$ is introduced into the second-pilot-pressure chamber R9 as the working fluid having the second pilot pressure $P_{PLT2}$.

In a state in which the second pilot piston 132 is held in contact with the first pilot piston 124, the second pilot piston 132 pushes the spool 120 toward the other-end side via the first pilot piston 124 as one constituent element of the first biasing mechanism 134, by the pressure of the working fluid in the second-pilot-pressure chamber R9, namely, by an action of the second pilot pressure $P_{PLT2}$. In other words, the second-pilot-pressure chamber R9 and the second pilot piston 132 define a second biasing mechanism 142 disposed on the one of opposite sides of the spool 120 nearer to the one end of the regulator 24 and configured to bias the spool 120 toward the other-end side.

The spool holding sleeve 116 has a large inner diameter at the other end portion thereof on the other-end side. In the other end portion of the spool holding sleeve 116, a counter piston 144 is disposed so as to be located on the other of the opposite sides of the spool 120 nearer to the other end of the regulator 24. The counter piston 144 has a main body portion 146 having a generally short cylindrical shape (a disc-like shape) and an extending portion 148 that extends from the main body portion 146 toward the one-end side. The main body portion 146 is slidably held by the spool holding sleeve 116. The extending portion 148 has an outer diameter substantially equal to that of the spool 120 and protrudes into the intermediate portion of the spool holding sleeve 116 by which the spool 120 is held. Thus, the counter piston 144 is slidably held also by the intermediate portion.

A spacing spring 150 which is a compression coil spring is disposed between the counter piston 144 and the spool 120 and biases the spool 120 toward the one-end side. The spool 120 and the first pilot piston 124 are pushed together by a biasing force of the spacing spring 150 toward the one-end side in the movable range of the spool 120.

A regulated-pressure chamber R10 is formed between an end wall of the housing body 112 and the other end portion of the counter piston 144 on the other-end side. An intra-spool passage 152 is formed in the spool 120. The intra-spool passage 152 communicates with the regulated-pressure port P12 and is open to an end wall of the spool 120 on the other-end side. The counter piston 144 is provided with a through passage 154 formed through the extending portion 148 and the main body portion 146. The working fluid to be supplied to the input chamber R4 of the master cylinder device 16, namely, the working fluid whose pressure is regulated by the regulator 24, i.e., the working fluid having the servo pressure $P_{SRV}$, is introduced to the regulated-pressure chamber R10 via the intra-spool passage 152 and the through passage 154.

The counter piston 144 pushes the spool 120 toward the one-end side via the spacing spring 150 by the pressure of the working fluid in the regulated-pressure chamber R10, namely, by an action of the servo pressure $P_{SRV}$ which is the regulated pressure. In other words, the counter piston 144 functions as a counter biasing piston configured to push the spool 120 in a direction opposite to the direction of the biasing forces applied by the first biasing mechanism 134 and the second biasing mechanism 142. The regulated-pressure chamber R10 and the counter piston 144 define a counter biasing mechanism 156 disposed on the other of the opposite sides of the spool 120 nearer to the other end of the regulator 24 and configured to bias the spool 120 toward the one-end side. In a strict sense, the spool 120 is biased toward the one-end side also by an action of the working fluid in the intra-spool passage 152 having the servo pressure $P_{SRV}$.

An annular first opposing chamber R11 is formed on the other of opposite sides of the main body portion 126 of the first pilot piston 124 nearer to the other end of the pressure regulator 24 and remote from the first-pilot-pressure chamber R8. That is, a first opposing chamber R11 that is opposed to the first-pilot-pressure chamber R8 is formed. The first opposing chamber R11 communicates with the reservoir 20 as the low-pressure source via communication passages 158, 158 formed in the spool holding sleeve 116. Each communication passage 158 has a function of allowing an inflow of the working fluid into the first opposing chamber R11 and an outflow of the working fluid from the first opposing chamber R11, for the purpose of allowing a change in the volume of the first opposing chamber R11 in accordance with a movement of the first pilot piston 124. Each communication passage 158 has a portion whose cross-sectional area is reduced. Specifically, each communication passage 158 has an orifice 160. The orifice 160 has a function of giving resistance to the flow of the working fluid passing through a corresponding one of the communication passages 158. Thus, in the regulator 24, the orifices 160, 160 define a first resistance giving mechanism configured to give resistance to both of the inflow of the working fluid into the first opposing chamber R11 and the outflow of the working fluid from the first opposing chamber R11, the inflow and the outflow depending on a change in the volume of the first opposing chamber R11. Further, the first opposing chamber R11, the communication passages 158, and the orifices 160 define a first damping mechanism configured to damp the movement of the first pilot piston 124, specifically, to damp both of the movement of the first pilot piston 124 toward the one-end side and the movement of the first pilot piston 124 toward the other-end side.

Similarly, an annular second opposing chamber R12 is formed on one of opposite sides of the main body portion 146 of the counter piston 144 nearer to the one end of the pressure regulator 24 and remote from the regulated-pressure chamber R10. That is, a second opposing chamber R12 that is opposed to the regulated-pressure chamber R10 is formed. The second opposing chamber R12 communicates with the reservoir 20 as the low-pressure source via communication passages 162, 162 formed in the spool holding sleeve 116. Each communication passage 162 has a function of allowing an inflow of the working fluid into the second opposing chamber R12 and an outflow of the working fluid form the second opposing chamber R12, for the purpose of allowing a change in the volume of the second opposing chamber R12 in accordance with a movement of the counter piston 144. Each communication passage 162 has a portion whose cross-sectional area is reduced. Specifically, each communication passage 162 has an orifice 164. The orifice 164 has a function of giving resistance to a flow of the working fluid passing through a corresponding one of the communication passages 162. Thus, in the regulator 24, the orifices 164, 164 define a second resistance giving mechanism configured to give resistance to both of the inflow of the working fluid into the second opposing chamber R12 and the outflow of the working fluid from the second opposing chamber R12, the inflow and the outflow depending on a change in the volume of the second opposing chamber R12. Further, the second opposing chamber R12, the communication passages 162, and the orifices 164 define a second damping mechanism configured to damp the movement of the counter piston 144, namely, to damp both of the movement of the counter piston 144 toward the one-end side and the movement of the counter piston 144 toward the other-end side.

A fluid chamber is formed on one of opposite sides of the buffer piston 138 nearer to the one end of the pressure regulator 24. The fluid chamber communicates with the atmospheric-pressure port P11 via an inner passage. The pressure of the working fluid in the fluid chamber is always kept at an atmospheric pressure $P_{RSV}$ (equal to the pressure of the working fluid in the reservoir 20).

The housing body 112 is provided with another high-pressure port P17 that communicates with the high-pressure port P10 via an inner passage. As apparent from FIG. 1, the high-pressure port P17 communicates with the pressure-increase linear valve 26 and a relief valve 170. The housing body 112 is further provided with another atmospheric-pressure port P18 that communicates with the atmospheric-pressure port P11 via an inner passage. As apparent form FIG. 1, the atmospheric-pressure port P18 communicates with the relief valve 170. In the arrangement, the working fluid having the high-pressure-source pressure $P_{ACC}$ and supplied from the high-pressure-source device 22 is supplied to the pressure-increase linear valve 26 via the regulator 24. When the high-pressure-source pressure $P_{ACC}$ becomes equal to or higher than a preset pressure, the working fluid from the high-pressure-source device 22 flows into the reservoir 20 via the regulator 24.

<Functions of Regulator>

In the regulator 24, when the first pilot pressure $P_{PLT1}$ which is the pressure of the working fluid in the first-pilot-pressure chamber R8 is increased by the pressure-increase linear valve 26 and the pressure-decrease linear valve 28, the spool 120 is biased toward the other-end side by the first biasing mechanism 134 and is moved from the moving end position on the one-end side to the moving end position on the other-end side. The spool valve mechanism 122 brings the high-pressure port P10 and the regulated-pressure port P12 into communication with each other by the movement of the spool 120, so that the pressure of the working fluid to be supplied to the input chamber R4 of the master cylinder device 16, namely, the servo pressure $P_{SRV}$, is increased. The increase in the servo pressure $P_{SRV}$ causes an increase in the pressure of the working fluid in the regulated-pressure chamber R10, so that the spool 120 is biased toward the one-end side by the counter biasing mechanism 156 and is moved toward the one-end side. That is, a state in which the biasing force by the first biasing mechanism 134 and the biasing force by the counter biasing mechanism 156 are balanced is maintained, and the pressure of the working fluid to be supplied to the master cylinder device 16, i.e., the servo pressure $P_{SRV}$, is regulated to a level based on the first pilot pressure $P_{PLT1}$.

To the second-pilot-pressure chamber R9, the working fluid having the master pressure $P_{MST}$ is introduced as the working fluid having the second pilot pressure $P_{PLT2}$. The ratio of pressure increase in the master cylinder device 16, namely, the ratio of the master pressure $P_{MST}$ to the servo pressure $P_{SRV}$ is substantially 1. The ratio of pressure increase in the regulator 24, namely, the ratio of the servo pressure $P_{SRV}$ to the first pilot pressure $P_{PLT1}$ is also substantially 1. When the pressure regulation by the first pilot pressure $P_{PLT1}$ is being conducted, the second biasing mechanism 142 is substantially prevented from applying the biasing force to the spool 120.

In an instance where the first pilot pressure $P_{PLT1}$ cannot be adjusted due to electric failure or the like, pressure regulation by the second pilot pressure $P_{PLT2}$ is conducted. When the master pressure $P_{MST}$, which is the pressure of the working fluid introduced as the working fluid having the second pilot pressure $P_{PLT2}$, is increased, the spool 120 is biased toward the other-end side by the second biasing mechanism 142 and is moved from the moving end position on the one-end side to the moving end position on the other-end side. The spool valve mechanism 122 brings the high-pressure port P10 and the regulated-pressure port P12 into communication with each other by the movement of the spool 120, so that the pressure of the working fluid to be supplied to the input chamber R4 of the master cylinder device 16, namely, the servo pressure $P_{SRV}$, is increased. The increase in the servo pressure $P_{SRV}$ causes an increase in the pressure of the working fluid in the regulated-pressure chamber R10, so that the spool 120 is biased toward the one-end side by the counter biasing mechanism 156 and is moved toward the one-end side. That is, a state in which the biasing force by the second biasing mechanism 142 and the biasing force by the counter biasing mechanism 156 are balanced is maintained, and the pressure of the working fluid to be supplied to the master cylinder device 16, i.e., the servo pressure $P_{SRV}$, is regulated to a level based on the second pilot pressure $P_{PLT2}$.

In the regulator 24, when the spool 120 is biased by the first biasing mechanism 134, the second biasing mechanism 142 is prohibited from biasing the spool 120. Further, when the first biasing mechanism 134 is disabled from biasing the spool 120, the second biasing mechanism 142 is allowed to bias the spool 120. In other words, when the pressure regulation by the first pilot pressure $P_{PLT1}$ is conducted, the pressure regulation by second pilot pressure $P_{PLT2}$ is prohibited. When the pressure regulation by the first pilot pressure $P_{PLT1}$ is disabled, the pressure regulation by the second pilot pressure $P_{PLT2}$ is allowed. The hydraulic brake system that employs the thus constructed regulator 24 is excellent in terms of fail safe in the event of electric failure or the like.

In the regulator 24, the rod portion 128 of the first pilot piston 124 is inserted into the blind hole 130 of the spool 120, and the distal end of the rod portion 128 comes into contact with the bottom wall of the blind hole 130, whereby the first pilot piston 124 and the spool 120 engage with each other. Consequently, the regulator 24 is relatively compact in size in the axial direction. The bottom wall of the blind hole 130 has the tapered shape while the distal end of the rod portion 128 has the curved convex shape. Even if the axis of the first pilot piston 124 is inclined, the biasing force by the first biasing mechanism 134, accordingly, the biasing force by the second biasing mechanism 142, can be applied to the spool 120 straightforward in the axial direction.

The regulator 24 includes the first damping mechanism and the second damping mechanism explained above. That is, the orifices 160 give resistance to the inflow and the outflow of the working fluid into and from the first opposing chamber R11 caused by the movement of the first pilot piston 124, whereby the movement of the first pilot piston 124 is damped. Further, the orifices 164 give resistance to the inflow and the outflow of the working fluid into and from the second opposing chamber R12 caused by the counter piston 144 as the counter biasing piston, whereby the movement of the counter piston 144 is damped. Consequently, excessive response of the spool valve mechanism 122 is prevented, and good controllability of the regulator 24 as the pressure regulator is ensured. Thus, the regulator 24 achieves good pressure regulation of the working fluid.

The first damping mechanism and the second damping mechanism respectively damp the movement of the first pilot piston 124 and the movement of the counter piston 144 by giving resistance to the flow of the working fluid. Thus, large resistance is given to a quick movement of the pistons 124, 144 while making resistance at the time of initiation of the movement relatively small, so that good response is ensured.

<Operations of Hydraulic Brake System>

As explained above, operations of the hydraulic brake system are controlled by the ECU30. For the operation of the high-pressure-source device 22, the brake ECU 30 activates the pump 90, namely, the motor 92, such that the high-pressure-source pressure $P_{ACC}$ detected by the high-pressure-source pressure sensor 96 is kept in a set pressure range defined by a set upper-limit pressure and a set lower-limit pressure.

For the operation of the master cylinder device 16, in the normal condition, the ECU30 controls the inter-chamber-communication switching valve 72 and the atmospheric-pressure release valve 76 to be energized so as to be placed in the valve open state and the valve closed state, respectively, so that the state is effectuated in which the braking force is generated in dependence on the high-pressure-source pressure. The ECU 30 then calculates a required braking force based on the brake operation amount and the brake operation force detected by the brake operation amount sensor 100 and the brake operation force sensor 102, respectively, and determines, as a required hydraulic braking force, a difference obtained by subtracting a regenerative braking force to be generated by a regenerative brake system from the calculated required braking force. The ECU 30 determines a target servo pressure on the basis of the required hydraulic braking force and controls the pressure-increase linear valve 26 and the pressure-decrease linear valve 28, namely, controls energizing currents to be respectively supplied thereto, such that the servo pressure $P_{SRV}$ detected by the servo pressure sensor 98 becomes equal to the target servo pressure. Owing to the control described above, in the hydraulic brake system, the required hydraulic braking force is generated in the brake device 12 provided for each wheel 10 in dependence on the pressure of the working fluid supplied from the high-pressure-source device 22 and regulated by the regulator 24.

On the other hand, the control by the ECU30 is not executed in the event of electric failure. As explained above, the inter-chamber-communication switching valve 72 and the atmospheric-pressure release valve 76 are not energized and are placed in the valve closed state and the valve open state, respectively, so that the state is effectuated in which the braking force is generated in dependence on the operation force and the high-pressure-source pressure. In the master cylinder device 16, the brake operation force is transmitted to the first pressurizing piston 42 and the second pressurizing piston 44 via the working fluid in the inter-piston chamber R3. The working fluid pressurized in dependence on the brake operation force is supplied from the output port P3, and the working fluid is introduced into the second-pilot-pressure chamber R9 of the regulator 24, so that the pressure regulation by the master pressure $P_{MST}$ is conducted in the regulator 24 and the working fluid having the servo pressure $P_{SRV}$ in accordance with the master pressure $P_{MST}$ is supplied from the regulator 24 to the input chamber R4 of the master cylinder device 16 as long as the high-pressure working fluid remains in the accumulator 94. The supply of the working fluid causes the braking force to be generated in the brake device 12 of each wheel 10, the braking force depending on both of the brake operation force and the pressure of the working fluid supplied from the high-pressure-source device 22 and regulated by the regulator 24. In this respect, after no more high-pressure working fluid remains in the accumulator 94, the brake device 12 of each wheel 10 generates the braking force in dependence on the brake operation force.

Embodiment 2

A hydraulic brake system for a vehicle according to a second embodiment differs from the system in the illustrated first embodiment in that the regulator 24 as the pressure regulator in the first embodiment is changed to another pressure regulator. In view of this, explanation of the hydraulic brake system of the second embodiment is limited to explanation of the pressure regulator.

Figure 3:
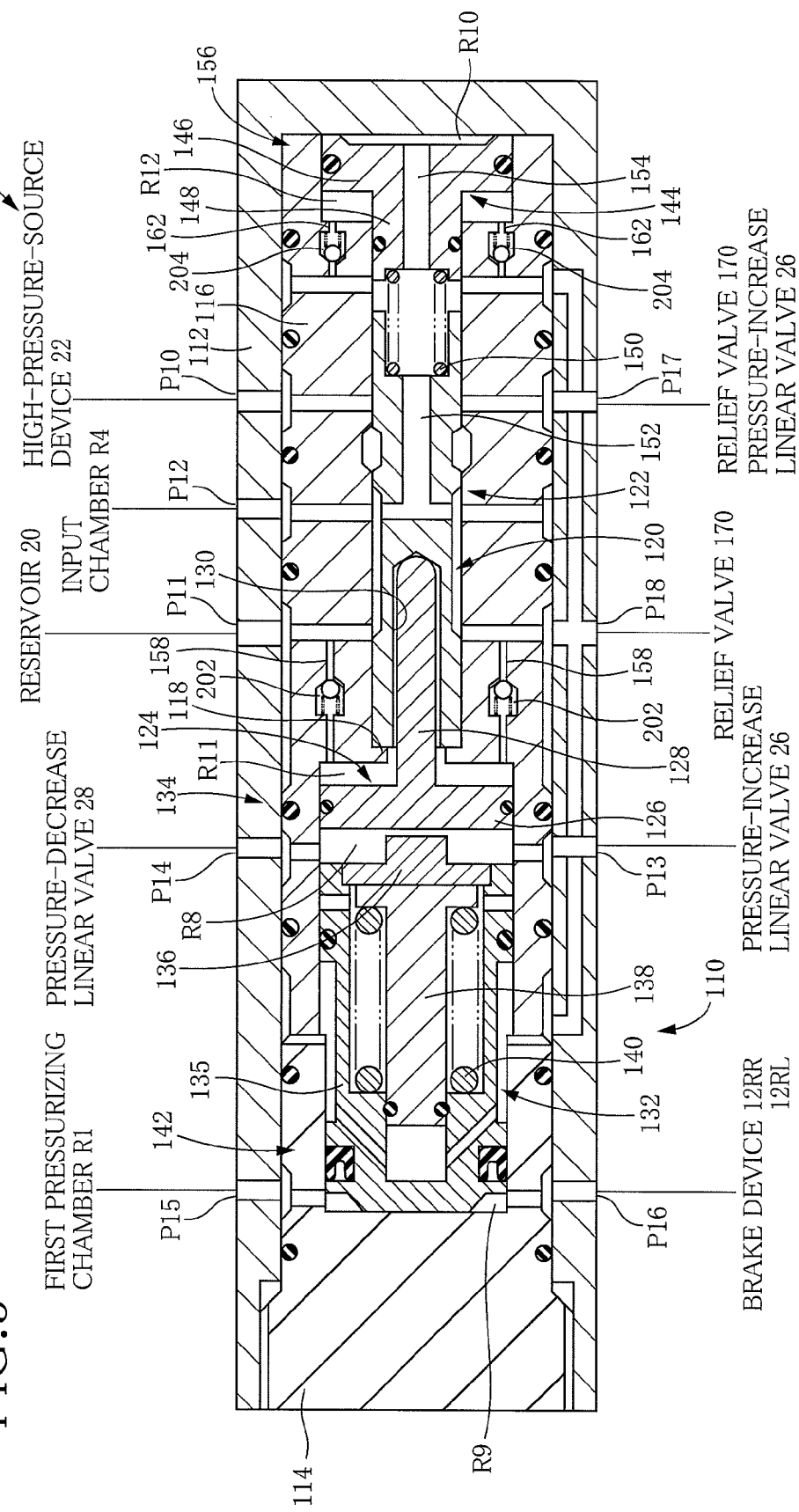
FIG. 3 is a cross-sectional view showing a pressure regulator according to a second embodiment.

As apparent from FIG. 3, a regulator 200 as the pressure regulator employed in the hydraulic brake system of the second embodiment differs from the regulator 24 in only a part thereof, and explanation of the regulator 200 is limited to the different part.

In the regulator 24, the first damping mechanism includes, as constituent elements thereof, the orifices 160 provided in the communication passages 158 formed in the spool holding sleeve 116, and the second damping mechanism includes, as constituent elements thereof, the orifices 164 provided in the communication passages 162 formed in the spool holding sleeve 116. In the regulator 200, check valves 202, 202 and check valves 204, 204 are provided in place of the orifices 160, 164.

Figure 4A:
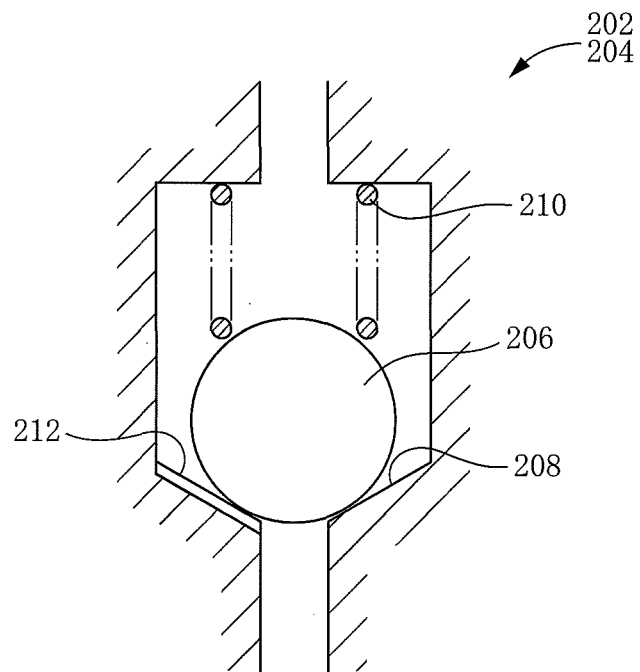
FIGS. 4A and 4B are schematic views each for explaining a structure and functions of a check valve having an orifice function that is employed in the pressure regulator according to the second embodiment.
Figure 4B:
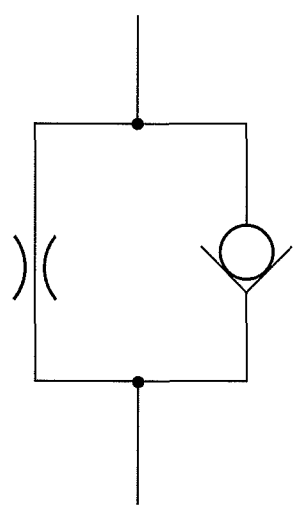

Each of the check valves 202, 204 schematically shown in FIG. 4A includes: a valve ball 206 as a valve member; a valve seat 208 on which the valve ball 206 is seated; and a spring 210 that biases the valve ball 206 in a direction in which the valve ball 206 is pushed onto the valve seat 208. The biasing force of the spring 210 is relatively small, and the check valves 202, 204 do not substantially give resistance to the flow of the working fluid in a direction from the lower side toward the upper side in FIG. 4A. An orifice groove 212 is formed on a surface of the valve seat 208 on which the valve ball 206 is seated. The working fluid that flows from the upper side toward the lower side in FIG. 4A passes through the orifice groove 212, and resistance is given to the flow of the working fluid from the upper side toward the lower side in FIG. 4A. That is, each of the check valves 202, 204 is a check valve having an orifice function and is configured to disable a function of the orifice in the form of each orifice groove 212, with respect to the flow of the working fluid in one direction. In this respect, the function of the check valves 202, 204 is expressed as shown in a circuit diagram of FIG. 4B.

As shown in FIG. 3, the first damping mechanism, namely, the check valve 202 that constitutes the first resistance giving mechanism, is disposed in such an orientation that resistance is given to the flow of the working fluid that flows out of the first opposing chamber R11 but substantial no resistance is given to the flow of the working fluid that flows into the first opposing chamber R11. Similarly, the second damping mechanism, namely, the check valve 204 that constitutes the second resistance giving mechanism, is disposed in such an orientation that resistance is given to the flow of the working fluid that flows out of the second opposing chamber R12 but substantial no resistance is given to the flow of the working fluid that flows into the second opposing chamber R12.

Thus, both of an instance in which the spool 120 moves toward the one-end side and in an instance in which the spool 120 moves toward the other-end side, any one of the first damping mechanism and the second damping mechanism damps the movement of any one of the movement of the first pilot piston 124 and the movement of the counter piston 144, so as to damp the movement of the spool 120. Also in the regulator 200, excessive response of the spool valve mechanism 122 is prevented, and the pressure regulator ensuring good controllability is achieved.

In the regulator 200, resistance is not given to the inflow of the working fluid into the first opposing chamber R11 and the inflow of the working fluid into the second opposing chamber R12. Thus, the pressure of the first opposing chamber R11 and the pressure of the second opposing chamber R12 are prevented from becoming a negative pressure, and aeration that arises from the negative pressure is avoided. As a result, the regulator 200 ensures a high degree of damping characteristics.

Modified Examples

The hydraulic brake system according to each of the illustrated two embodiments is configured such that the working fluid to be supplied from the master cylinder device 16 to the brake devices 12, namely, the working fluid having the master pressure $P_{MST}$, is introduced into the regulator 24, 200 as the working fluid having the second pilot pressure $P_{PLT2}$. In place of the working fluid having the master pressure $P_{MST}$, the working fluid having a pressure corresponding to a level in accordance with the brake operation force may be introduced into the second-pilot-pressure chamber. Such a working fluid enables appropriate pressure regulation by the regulator 24, 200 in the event of electric failure or the like, so that the hydraulic brake system can generate an appropriate braking force in the brake devices 12. Specifically, the working fluid in the inter-piston chamber R3 may be introduced into the second-pilot-pressure chamber. In the master cylinder device 16, the inter-chamber-communication switching valve 72 is placed in the valve closed state in the event of electric failure or the like, so that the inter-piston chamber R3 is hermetically closed. In this state, the pressure of the working fluid in the inter-piston chamber R3 is equal to the pressure corresponding to the level in accordance with the brake operation force, thereby enabling appropriate pressure regulation even if the pressure of the working fluid the inter-piston chamber R3 is utilized as the second pilot pressure $P_{PLT2}$.

Both of the regulator 24 and the regulator 200, each as the pressure regulator, according to the illustrated two embodiments have both of the first damping mechanism and the second damping mechanism. Instead, the pressure regulator may be configured to have only one of the first damping mechanism and the second damping mechanism. Even such a pressure regulator is expected to ensure a certain degree of damping effect by the one damping mechanism. In an instance where the pressure regulator has only one of the damping mechanisms, the one damping mechanism is desirably configured to have a resistance giving mechanism that gives resistance to both of the outflow of the working fluid from the opposing chamber and the inflow of the working fluid into the opposing chamber. Such a damping mechanism exhibits a damping effect both of when the spool 120 moves toward the one-end side and when the spool 120 moves toward the other-end side, so that sufficiently good pressure regulation is achieved.

What is claimed is:

1. A pressure regulator configured to regulate a working fluid having a high pressure and supplied from a high-pressure source, to a regulated pressure by a pilot pressure and configured to supply the pressure-regulated working fluid, comprising:
    a housing;
    a high-pressure port to which is supplied the working fluid supplied from the high-pressure source, a low-pressure port which is to communicate with a low-pressure source, and a regulated-pressure port for supplying the pressure-regulated working fluid, the high-pressure port, the low-pressure port, and the regulated-pressure port being provided on the housing;
    a spool valve mechanism provided in the housing and having a spool configured to be movable in an axial direction of the pressure regulator, the spool valve mechanism being configured such that, when the spool is located at an end position in a movable range thereof that is nearer to one end of the pressure regulator in the axial direction, communication between the low-pressure port and the regulated-pressure port is allowed while communication between the high-pressure port and the regulated-pressure port is shut off and such that, when the spool is moved toward the other end of the pressure regulator in the axial direction, the communication between the low-pressure port and the regulated-pressure port is shut off while the communication between the high-pressure port and the regulated-pressure port is allowed;
    a biasing mechanism provided in the housing on one of opposite sides of the spool nearer to the one end of the pressure regulator and including a pilot-pressure chamber to which is introduced a working fluid having the pilot pressure and a pilot piston configured to push the spool toward the other end of the pressure regulator by the pressure of the working fluid in the pilot-pressure chamber applied to the pilot piston, the biasing mechanism being configured to bias the spool toward the other end of the pressure regulator by the pressure of the working fluid in the pilot-pressure chamber;
    a counter biasing mechanism provided in the housing on the other of the opposite sides of the spool nearer to the other end of the pressure regulator and having a regulated-pressure chamber which communicates with the regulated-pressure port and to which is introduced the working fluid having the regulated pressure and a counter biasing piston configured to push the spool toward the one end of the pressure regulator by the pressure of the working fluid in the regulated-pressure chamber applied to the counter biasing piston, the counter biasing mechanism being configured to bias the spool toward the one end of the pressure regulator by the pressure of the working fluid in the regulated-pressure chamber; and
    at least one of a first damping mechanism configured to damp a movement of the pilot piston and a second damping mechanism configured to damp a movement of the counter biasing piston.

2. The pressure regulator according to claim 1,
    wherein, where the pressure regulator comprises the first damping mechanism as the at least one of the first damping mechanism and the second damping mechanism, the first damping mechanism includes: an opposing chamber provided on one of opposite sides of a portion of the pilot piston remote from the pilot-pressure chamber, a volume of the opposing chamber changing in accordance with the movement of the pilot piston; and a resistance giving mechanism configured to give resistance to at least one of an inflow of the working fluid into the opposing chamber and an outflow of the working fluid from the opposing chamber, the inflow and the outflow depending on a change in the volume of the opposing chamber, and
    wherein, where the pressure regulator comprises the second damping mechanism as the at least one of the first damping mechanism and the second damping mechanism, the second damping mechanism includes: a second opposing chamber provided on one of opposite sides of a portion of the counter biasing piston remote from the regulated-pressure chamber, a volume of the second opposing chamber changing in accordance with the movement of the counter biasing piston; and a resistance giving mechanism configured to give resistance to at least one of an inflow of the working fluid into the second opposing chamber and an outflow of the working fluid from the second opposing chamber, the inflow and the outflow depending on a change in the volume of the second opposing chamber.

3. The pressure regulator according to claim 2, wherein the resistance giving mechanism includes an orifice provided in a communication passage that communicates with the low-pressure source so as to permit the inflow of the working fluid into the opposing chamber and the outflow of the working fluid from the opposing chamber.

4. The pressure regulator according to claim 3, wherein the resistance giving mechanism includes a check valve provided in the communication passage for disabling a function of the orifice with respect to one of the inflow of the working fluid into the opposing chamber and the outflow of the working fluid from the opposing chamber.

5. The pressure regulator according to claim 1,
    wherein the pilot piston has a rod portion that extends toward the other end of the pressure regulator, and the spool has a blind hole that is open at one end portion thereof nearer to the one end of the pressure regulator, and
    wherein the rod portion is configured such that a distal end thereof is to engage with the spool at a bottom wall of the blind hole.

6. The pressure regulator according to claim 5, wherein the bottom wall of the blind hole has a tapered shape, and the distal end of the rod portion of the pilot piston has a curved convex shape.

7. The pressure regulator according to claim 1, wherein, where the biasing mechanism is defined as a first biasing mechanism, the pilot pressure is defined as a first pilot pressure, and the pilot-pressure chamber is defined as a first-pilot-pressure chamber, the pressure regulator further comprises a second biasing mechanism provided in the housing on the one of the opposite sides of the spool nearer to the one end of the pressure regulator and having a second-pilot-pressure chamber to which is introduced a working fluid having a second pilot pressure different from the first pilot pressure, the second biasing mechanism being configured to bias the spool toward the other end of the pressure regulator by the pressure of the working fluid in the second-pilot-pressure chamber.

8. A hydraulic brake system for a vehicle, comprising:
   a brake operation member;
   a brake device provided for a wheel of the vehicle;
   a master cylinder device to which is introduced the pressure-regulated working fluid, the master cylinder device being configured to pressurize a working fluid to a pressure in accordance with a pressure of the working fluid introduced thereto and configured to supply the pressurized working fluid to the brake device;
   a high-pressure-source device, as the high-pressure source, configured to supply a working fluid having the high pressure;
   a pressure adjusting device configured to be controlled so as to adjust a pressure of a working fluid to a given pressure; and
   the pressure regulator defined in claim 1,
   wherein the working fluid supplied from the pressure adjusting device is introduced to the pilot-pressure chamber as the working fluid having the pilot pressure, and the working fluid whose pressure is regulated by the pressure regulator is introduced to the master cylinder device.

9. The hydraulic brake system according to claim 8,
   wherein the pressure regulator is the pressure regulator wherein, where the biasing mechanism is defined as a first biasing mechanism, the pilot pressure is defined as a first pilot pressure, and the pilot-pressure chamber is defined as a first-pilot-pressure chamber, the pressure regulator further comprises a second biasing mechanism provided in the housing on the one of the opposite sides of the spool nearer to the one end of the pressure regulator and having a second-pilot-pressure chamber to which is introduced a working fluid having a second pilot pressure different from the first pilot pressure, the second biasing mechanism being configured to bias the spool toward the other end of the pressure regulator by the pressure of the working fluid in the second-pilot-pressure chamber; and
   wherein one of a working fluid having a pressure in accordance with a brake operation force applied to the brake operation member and the working fluid supplied from the master cylinder device to the brake device is introduced to the second-pilot-pressure chamber as the working fluid having the second pilot pressure.

* * * * *